United States Patent
Fourcot et al.

(10) Patent No.: US 6,290,872 B1
(45) Date of Patent: Sep. 18, 2001

(54) COMPOSITION CONTAINING AT LEAST SODIUM BICARBONATE, PREPARATION METHOD THEREFOR AND USES THEREOF

(75) Inventors: Fabrice Fourcot, Velizy; Jean-Claude Pouxviel, Prelissac; Christophe Zing, Leimbach, all of (FR)

(73) Assignee: Novacarb, Courbevoie Cedex (FR)

( * ) Notice: Subject to any disclaimer, the term of this patent is extended or adjusted under 35 U.S.C. 154(b) by 0 days.

(21) Appl. No.: 09/068,034

(22) PCT Filed: Oct. 31, 1996

(86) PCT No.: PCT/FR96/01720

§ 371 Date: Sep. 10, 1998

§ 102(e) Date: Sep. 10, 1998

(87) PCT Pub. No.: WO97/16377

PCT Pub. Date: May 9, 1997

(30) Foreign Application Priority Data

Oct. 31, 1995 (FR) .................................................. 95 12973

(51) Int. Cl.$^7$ ................. C09K 3/00; C11D 3/06
(52) U.S. Cl. ................. 252/192; 252/193; 510/509; 423/244.08
(58) Field of Search .................... 252/192, 193; 423/244.08; 510/509

(56) References Cited

U.S. PATENT DOCUMENTS

| 3,868,444 | * | 2/1975 | Frevel et al. | 423/422 |
|---|---|---|---|---|
| 4,283,372 | * | 8/1981 | Frint et al. | 423/206 |
| 4,385,039 | | 5/1983 | Lowell | 423/243.12 |
| 4,664,893 | * | 5/1987 | Sarapata et al. | 423/244.08 |
| 5,002,741 | * | 3/1991 | Hooper | 423/239 |
| 5,221,544 | * | 6/1993 | Sweeney et al. | 426/72 |
| 5,270,023 | * | 12/1993 | May et al. | 423/182 |
| 5,482,646 | * | 1/1996 | Mazzola | 510/349 |
| 5,585,081 | * | 12/1996 | Chu et al. | 423/239.1 |
| 5,830,422 | * | 12/1998 | Kresnyak et al. | 423/243.08 |

FOREIGN PATENT DOCUMENTS

| 0 015 626 | 3/1980 | (EP) . |
|---|---|---|
| 1 178 417 | 5/1959 | (FR) . |
| 2 106 489 | 9/1982 | (GB) . |
| 95 19835 | 7/1995 | (WO) . |

OTHER PUBLICATIONS

Database WPI, Section CH, Week 9333, Derwent Publications Ltd., London, GB, Class D16, AN 93–261949 XP002024876 & JP 05 179 299 A (Lion Corp), Jul. 20, 1993.

Patent Abstracts of Japan, vol. 015, No. 282 (C–0850), Jul. 17, 1991 & JP 03 098540 A (Nisshin Flour Milling Co. Ltd.), Apr. 24, 1991.

* cited by examiner

Primary Examiner—Jill Warden
Assistant Examiner—LaToya Cross
(74) Attorney, Agent, or Firm—Burns, Doane, Swecker & Mathis, L.L.P.

(57) ABSTRACT

A composition having sodium bicarbonate, sodium carbonate, and ammonia in the form of ammonium salts is formed by heat treating ammoniacal bicarbonate at a temperature between 20 and 150° C. A method of using the composition includes reacting the composition with a flue gas containing HX acids, where X represents halogens, compounds of the $SO_x$ type, or mixtures thereof, or the flue gases may contain $NO_x$ compounds.

35 Claims, No Drawings

COMPOSITION CONTAINING AT LEAST SODIUM BICARBONATE, PREPARATION METHOD THEREFOR AND USES THEREOF

This Application is a 371 of PCT FR96/01720, filed on Oct. 31, 1996.

The subject-matter of the present invention is a novel composition comprising at least sodium bicarbonate, its process of preparation and its uses, in particular in the treatment of flue gases, in the field of detergency and in animal food.

The treatment of flue gases comprising all kinds of pollutants, for example inorganic acids, such as acids of formula HX, in which X represents a halogen, or compounds of the $SO_x$ or $NO_x$ type, organic derivatives, such as dioxins or furans, for example, and metals regarded as toxic, is exhibiting a particular rapid expansion due to the increasing pressure of environmental regulations exerted on companies emitting such waste gases.

Mention may be made, among processes which generate such gases, of, inter alia, incinerators of domestic waste, incinerators of hospital waste and of special industrial waste, thermal power stations or furnaces of glass manufacturing type but also some production processes in the chemical industry.

Conventional plants for the treatment of gases employ so-called dry route or semi-wet route treatments. In the first case, the agent for neutralizing the flue gases is introduced in the form of a solid and, in the second case, the said agent is employed in the form of an aqueous suspension or solution, the amount of water of which is calculated so that the product resulting from the treatment is a solid, as in the first case.

One of the oldest processes of dry type uses lime as reactant, which requires a high stoichiometric ratio because of the low reactivity of lime.

These processes, in addition, exhibit the disadvantage of creating solid waste which is very difficult to recover in value and which has to be disposed of on a special landfill site, due to the presence of metals regarded as toxic. The amounts of solids in this case are relatively high and result in high additional costs for the process.

A more advantageous process consists in using sodium bicarbonate. The use of this neutralizing agent makes it possible to have a solid waste which can itself be readily recycled. Furthermore, the molar amount of sodium bicarbonate, with respect to the compounds to be neutralized present in the gases to be treated, is much lower than in the case of lime.

This latter type of process constitutes a technological advance in this field. However, it remains important to reduce the costs of such treatments and be able to use a readily available product with a sufficient sodium bicarbonate content and which is free from troublesome impurities.

The subject-matter of the present invention is a novel composition, comprising at least sodium bicarbonate, intended for the treatment of flue gases resulting from incineration of domestic waste, of hospital waste or of special industrial waste, or of flue gases resulting from thermal power stations or from glass manufacturing furnaces, but also for the field of detergency and for animal food.

It also relates to a simple process for producing the said composition.

Thus, a first subject-matter of the invention is a novel composition comprising at least sodium bicarbonate.

The second subject-matter of the invention is composed of the preparation of a composition comprising at least sodium bicarbonate, characterized in that a heat treatment of an ammoniacal bicarbonate is carried out at a temperature of between 20 and 150° C.

A preferred alternative form of the invention consists in carrying out the heat treatment under a controlled atmosphere which can comprise water and/or carbon dioxide.

Furthermore, a third subject-matter of the present invention relates to the treatment of flue gases comprising mainly acids of the HX type, with X representing a halogen, or mainly compounds of the $SO_x$ type, these compounds being alone or as a mixture, and metals regarded as toxic, in which treatment the bicarbonate resulting from the process according to the invention is used as reactant.

However, other characteristics and advantages of the present invention will become more clearly apparent on reading the description and examples which will follow.

Before describing the process according to the invention in more detail, it should be made clear that the heat-treated ammoniacal bicarbonate is the intermediate product obtained by employing the process for the preparation of sodium carbonate by the ammonia soda technique, also known under the name of "Solvay process".

More specifically, the name ammoniacal bicarbonate is given, for the purposes of the present invention, to the product obtained after dissolution of gaseous ammonia in an aqueous sodium chloride solution, so as to produce an ammoniacal brine. The latter is subsequently treated with a gas containing carbon dioxide in order to give ammoniacal bicarbonate crystals.

Ammoniacal bicarbonate in fact denotes a composition comprising mainly sodium bicarbonate, sodium carbonate and, to a lesser extent, ammonia in the form of ammonium salts, such as bicarbonate, carbonate and/or carbamate, and water.

By way of indication, this composition comprises: 70 to 90% by weight of sodium bicarbonate ($NaHCO_3$), 2 to 20% by weight of sodium carbonate ($Na_2CO_3$), 0.2 to 1.0% by weight of ammonia, expressed in the form of the ammonium ion, 0.3 to 2.0% by weight of ammonium carbamate ($NH_4O_2CNH_2$) and 5 to 20% by weight of water.

In contrast to what was expected, the treatment of ammoniacal bicarbonate within the specified temperature range, more particularly at high temperature, and under a controlled atmosphere with respect to water and/or carbon dioxide, makes it possible to dry and to decompose selectively the ammonium salts present, such as bicarbonate, carbonate and/or carbamate, to ammonia and carbon dioxide, without substantial decomposition of the sodium bicarbonate present in the mixture to sodium carbonate.

This is because it should not be forgotten that the final stage in the Solvay process consists in calcining the ammoniacal bicarbonate at a temperature of the order of 200° C. in order to give sodium carbonate. Consequently, it was not obvious that a heat treatment at temperatures which can be as high as 120° C.–130° C. would have allowed such a result to be achieved.

As was indicated previously, the heat treatment according to the invention is carried out at a temperature of between 20 and 150° C., preferably under a controlled atmosphere which can comprise water and/or carbon dioxide.

According to a preferred embodiment of the invention, the heat treatment can take place at a temperature of between 20 and 130° C.

More particularly, the heat treatment is carried out in the presence of an atmosphere with a water vapour content of between 0 and 10 molar %.

As regards the carbon dioxide, the heat treatment is carried out in the presence of an atmosphere with a carbon dioxide content of between 0 and 100 molar %.

Furthermore, the heat treatment according to the invention is carried out under an atmosphere which can comprise air or any other inert gas, such as rare gases or nitrogen. The content of this type of gas, if it is used, provides the complement in order to reach the desired total pressure.

According to a preferred embodiment of the invention, the heat treatment is carried out in the presence of water vapour and of carbon dioxide.

It is has been found that the temperature for treatment of ammoniacal bicarbonate could be adjusted according to the amount of water vapour present and the amount of carbon dioxide present.

Thus, in the case where the atmosphere is a nitrogen/oxygen or air mixture, the temperature range for the heat treatment will preferably be below 80° C.

Furthermore, if the treatment is carried out under an atmosphere comprising a mixture of carbon dioxide and water vapour, and optionally air or an inert gas, it is then possible to envisage carrying out the latter at a temperature close to 120° C.–130° C., although lower temperatures remain possible.

For the preceding, the temperature values are expressed at atmospheric pressure. A person skilled in the art is capable of adjusting the temperature values according to the pressure under which the treatment is carried out.

This is because the preparation of the composition according to the invention can be carried out under any pressure.

The treatment according to the invention is preferably carried out under a gas flow. One reason for this is that it is highly desirable not to maintain an ammonia partial pressure above the ammoniacal bicarbonate, in order to promote the decomposition of the ammonium salts, such as bicarbonate, carbonate and/or carbamate.

The duration of the operation is usually at most a few hours.

The heat treatment is more particularly carried out with agitation.

The novel composition obtained according to the process of the invention and which constitutes another subject-matter of the invention can comprise at least sodium bicarbonate, at least sodium carbonate and at least ammonia in the form of ammonium salts, such as bicarbonate, carbonate and/or carbamate.

The sodium bicarbonate content is advantageously at least 70% by weight, preferably at least 80% and more particularly between 80 and 95% by weight. The amount of sodium carbonate present is advantageously less than 30% by weight, preferably less than 20% and more particularly between 5 and 15% by weight. The amount of ammonia, expressed in the form of the ammonium ion, present is preferably less than 1% by weight, and more particularly varies between 0.2 and 0.7% by weight.

This composition can additionally comprise carbamate salts and water. The ammonium carbamate content is preferably less than 0.1% by weight and more preferably between 0.01 and 0.06% by weight. Water is present preferably in an amount of less than 10% by weight and more preferably from 1 to 6% by weight.

It would not be departing from the scope of the invention to convert the composition of the invention into the form of an aqueous solution and/or suspension.

The solution can generally comprise from 50 to 150 g/l of the composition. As regards the aqueous suspension, it comprises from 10 to 50% by weight of the said composition.

The said composition can therefore be used, and this constitutes a third subject-matter of the invention, for the treatment of flue gases comprising mainly acids of formulae HX, with X representing a halogen, or mainly compounds of the $SO_x$ type, these compounds being alone or as a mixture, and metals regarded as toxic.

According to a first alternative form of the invention, the flue gases to be treated mainly comprise acids of formula HX, in which X represents a halogen, and metals regarded as toxic. More particularly, X represents chlorine. The said flue gases can additionally contain, to a lesser extent, compounds of the $SO_x$ type.

Metals regarded as toxic more particularly denotes heavy metals and/or polyvalent metals. Mention may be made, by way of example but without wishing to be restricted, of mercury, cadmium, lead, arsenic, selenium, silver, antimony, zinc, aluminium, silicon, calcium, titanium, chromium, manganese, iron, nickel, copper, molybdenum, tin, bismuth, vanadium or cobalt.

The flue gases of this type are more particularly due to the incineration of household refuse, of hospital waste or of special industrial waste.

According to a second alternative form of the present invention, the flue gases to be treated mainly comprise compounds of the $SO_x$ type and metals regarded as toxic. $SO_x$ is understood to mean in particular compounds of the $SO_2$ or $SO_3$ type. These flue gases can also comprise, to a lesser extent, sulphites or bisulphites, or acids of formulae HX in which X represents a halogen.

The flue gases of this type are more particularly encountered in the operation of thermal power stations or glass manufacturing furnaces, for example.

Furthermore, it should be noted that such flue gases, whether they correspond to the first or to the second alternative form, can also comprise dust and/or fly ash, as well as other pollutants, such as compounds of the $NO_x$ type or organic compounds, such as dioxins or furans.

The flue gases can advantageously be treated by the semi-wet route or by the dry route.

Semi-wet route defines a process in which the composition resulting from the process according to the invention (also known subsequently as reactant) is introduced in the presence of water in an amount such that the products obtained after the treatment are found in a solid form. In this case, the reactant is employed in the form of a suspension or a solution.

The water content necessary in order to obtain a solution or a suspension of the reactant can be determined by a person skilled in the art according to the technological constraints of the process. More particularly, this content depends on the temperature for treatment of the flue gases, on the evaporative capacity of the equipment and on the fact that it is desired to obtain, after the said treatment, a solid product.

Dry route more particularly denotes a treatment in which the reactant is introduced in the solid state into the flue gases.

In this case, two types of operation can be distinguished: the first alternative form is carried out without introducing additional water and the second alternative form is carried out while introducing water but in an amount such that the reactant retains its powder appearance.

In the latter case, the water content is between 2 and 15% by weight with respect to the reactant. The amount of water is preferably between 5 and 10%.

It is preferable to use a reactant, which is provided in solid form, with a fine and controlled particle size, so as to improve the kinetics of the neutralization treatment.

For example, it is preferable to use a reactant with a mean particle size of less than 50 µm. According to a more specific embodiment, use is made of a reactant with a mean particle size of between 5 and 30 µm.

If a reactant with a particle size greater than or of the order of 50 µm is employed, it can be advantageous to carry out, prior to the treatment of the flue gases, a stage of milling the said reactant in order to achieve a particle size of the order of 5 to 30 µm. Such a stage can be carried out by any conventional means known to a person skilled in the art.

If the alternative form with introduction of water at the time of use is employed, the water can be introduced before the treatment of the flue gases or alternatively during the treatment of these flue gases.

Thus, the water in sprayed form and the reactant can be brought into contact in a wetting drum, if the introduction of water takes place before the treatment of the flue gases proper.

In the case where the water is introduced during the operation of bringing the reactant into contact with the flue gases, the water is injected in the required amounts directly into the gas stream.

Of course, the combination of these possibilities can be envisaged.

The amount of reactant employed in the process for the treatment of flue gases according to the invention depends on the amount of compounds present to be neutralized.

According to a specific embodiment of the invention, the treatment of flue gases is carried out so that the stoichiometric ratio of the reactant to the compounds of the $SO_x$ type is between 1.02 and 2 and/or the stoichiometric ratio of the reactant to the compounds of the acids of formula HX type is between 1.02 and 2.

The said stoichiometric ratio is preferably between 1.02 and 1.5. According to an advantageous embodiment, the stoichiometric ratio is between 1.05 and 1.3.

If the flue gases to be treated comprise organic pollutants, it may be advantageous to inject an adsorbant into the gas stream, with the reactant and optionally water. The adsorbant, comprising the organic pollutants, can subsequently be recovered with the solids resulting from the treatment of the flue gases.

It should be noted that this treatment also makes it possible to increase the amount of mercury recovered, if it is present in the flue gases.

The adsorbant is generally active charcoal and/or semi-coke.

In addition, if the flue gases comprise dust or fly ash, they can be recovered with the solids produced during neutralization or else prior to the treatment according to the invention, by conventional methods.

The operation of bringing the said flue gases into contact with the reactant, optionally water and the adsorbant, is carried out in a known way.

Thus, it can take place cocurrentwise or countercurrentwise.

The treatment can likewise be carried out in any type of reactor promoting the dispersion of the solid, of the suspension or of the solution in the flue gases, such as reactors comprising systems of Venturi type or fluidized bed reactors.

The solids produced by the process for treating the flue gases are subsequently separated by employing conventional techniques, such as electrostatic filters or sleeve filters.

According to an advantageous embodiment of the present invention, at least part of the solids resulting from the treatment of the flue gases is recycled to a new stage of treatment of the flue gases.

The temperature for treatment of the flue gases depends on various technological constraints.

It depends in particular on the temperature of the flue gases to be treated, on the water content, on the presence of a subsequent catalytic treatment of $NO_x$ and on the temperature stability of the equipment.

By way of indication, the temperature for treatment of the flue gases is between 70 and 500° C. and more particularly between 130 and 400° C.

In the case where treatment is carried out by the dry route in the presence of water introduced at the time of use, the said solids can be recycled to the region for preparation of the reactant/water mixture.

If the water is brought into contact in the neutralization region, the solids are introduced into this region, separately or with introduction of fresh reactant.

This embodiment with recycling is advantageous in further increasing the efficiency of the process, in particular in the case of a short residence time in the neutralization region. This embodiment likewise makes it possible to lower the thresholds for purification of the flue gases.

The solids resulting from the process according to the invention exhibit the advantage of being recoverable in value.

Thus, the solids resulting from the treatment of the flue gases are purified by employing a first stage of dissolution in water, followed by a stage of separation of the metals regarded as toxic which they contain.

In the more specific case where the flue gases mainly comprise acids of formula HX, and more particularly hydrochloric acid, the solids resulting from the process according to the invention are based on sodium halides, such as sodium chloride, in addition to metals regarded as toxic.

In this case, the solids are brought into contact with water, the effect of which is to dissolve the sodium halides present and some of the metals regarded as toxic which are present. A first stage of separation of the remaining insoluble materials is subsequently carried out, generally by filtration.

The metals regarded as toxic which have been dissolved are, in their turn, separated from the aqueous sodium chloride solution to be purified. More particularly, one or more precipitation stages is/are employed.

The pH value is controlled by adding either an acid or a base. For obvious reasons targeted at not contaminating the mixture, the acid and the base are chosen according to the ions which they introduce. For this reason, it is preferable to use hydrochloric acid as acid and sodium hydroxide, sodium carbonate or sodium bicarbonate as bases. The precipitates of the metals regarded as toxic are subsequently removed, in particular by filtration.

According to a specific alternative form and in the case where the solution comprises sulphates, obtained by neutralization of the $SO_x$ during the treatment of the flue gases, and optionally sodium fluoride, an agent for precipitating the compounds, such as calcium chloride, can be added. The gypsum and the calcium fluoride which have precipitated are subsequently separated. This separation stage can take place at the same time as that of the precipitate containing the metals regarded as toxic.

In the case where a degree of purity of the aqueous sodium chloride solution is desired, it is possible to carry out one or more additional purification stages.

A first alternative form consists in bringing the said aqueous solution into contact with one or more ion-exchange resins. The resins can be in the hydrogen or sodium form with, however, a preference for the second type of resin, which makes possible optimum extraction of the ions of the metals regarded as toxic present in the solution.

Another possible alternative form relates to the use of agents such as inorganic sulphides or organic sulphur-containing compounds. Mention may be made, among inorganic sulphides, of sodium, iron or barium sulphides. Mention may more particularly be made, as example of organic sulphur-containing compounds, of the trisodium salt of trimercaptos-triazine, as a 15% solution in water (TMT 15®).

A third alternative form would consist of the combination of these possibilities.

The aqueous sodium chloride solutions, the degrees of purity of which can be adjusted, are recoverable in value in various industrial processes. Thus, these solutions can participate in the synthesis of sodium carbonate or bicarbonate (Solvay process) or in the preparation of sodium hydroxide solutions by electrolysis.

In the case where the flue gases are instead based on compounds of the $SO_x$ type, the residues obtained, based mainly on sodium sulphate and likewise comprising metals regarded as toxic, can also advantageously be recovered in value after purification.

A first stage here again consists in bringing the solid residues into contact with water or a recycled aqueous solution comprising sodium sulphate.

The aim of this second stage is, on the one hand, to selectively dissolve the sulphates, if appropriate the halogen salts, which are generally chlorides. On the other hand, the object at this stage is to leave in suspension most of the metals regarded as toxic.

Such a selective dissolution operation is carried out by controlling the pH of the medium in order to be within a range of minimum solubility of the metals, which are in particular in the hydroxide and/or carbonate form.

It is clear that the range depends on the nature of the metals present and a compromise between each of them may be necessary.

As a general rule, dissolution is carried out in a pH range of between 3 and 10 inclusive.

According to a first alternative form and if aluminium is not present in a large amount with respect to the other metals, a pH range lying between 7 and 10 inclusive represents a good compromise. More particularly, the dissolution can be carried out in a pH range of between 7 and 9 inclusive.

According to a second alternative form and in the case where the amount of aluminium is high, it may be desirable to carry out the dissolution at a pH of between 3 and 7 inclusive.

It would not be departing from the scope of the present invention to employ the two abovementioned alterative forms successively. Thus, the dissolution stage can correspond to two successive stages with an intermediate separation stage, one carried out at a pH of between 7 and 10 and the second at a pH of between 3 and 7, the order depending on the pH value of the starting solution.

The pH value is controlled by adding either an acid or a base, chosen so as not to contaminate the mixture. Thus, it is preferable to use sulphuric acid, sodium carbonate or sodium bicarbonate.

The stage of selective dissolution of the sulphates is carried out, according to a specific embodiment of the invention, at a temperature of between 15 and 80° C., more particularly between 20 and 60° C. An advantageous embodiment consists in carrying out this dissolution at a temperature in the region of 30–40° C.

After dissolution and in the case where the treated flue gases contain sulphites or bisulphites, these components can be oxidized to sulphates. This operation is generally carried out by adding at least one oxidizing compound to the mixture, optionally combined with heating the latter. Mention may be made, as examples of oxidizing compounds, of air, hydrogen peroxide, persulphates or the salt of Caro's acid.

Once the sodium sulphate has dissolved, the solution is separated, by filtration or any other conventional method, from the solids which it contains.

The solid residues can then be disposed of on a landfill site. It is found that, at this stage, the amount of waste to be disposed of on a landfill site has greatly decreased, with respect to the conventional processes for neutralizing with lime, while employing a simple process.

The filtrate, corresponding to a purified aqueous sodium sulphate solution, is subsequently treated so as to crystallize the said sulphate.

This operation can be carried out by any means known to a person skilled in the art.

According to a first alternative form, the filtrate is cooled until a temperature difference of 15 to 20° C. between the dissolution and crystallization temperatures is obtained.

In this case, the crystals obtained are in the decahydrate form.

According to a second alternative form, the sodium sulphate is crystallized by evaporating at least part of the water of the solution.

The resulting crystals are in the anhydrous form.

The liquid resulting from the crystallization can advantageously be recycled to the stage of dissolution of the solids resulting from the stage of treatment of the flue gases.

Before recycling, it may be advantageous to remove part of this liquid in order to avoid enriching the liquids with metals regarded as toxic or optionally to treat this liquid.

Although such a stage is only optional, it is here again possible to carry out, before the crystallization of the sodium sulphate, an additional purification of the solution, so as to remove the metals regarded as toxic possibly remaining in solution.

A first method consists in adding, to the solution, at least one appropriate precipitating agent chosen in particular from alkali metal hydroxides, sodium carbonate, sodium carbonate or silicates, it being possible for these precipitating agents to be used alone or as a mixture.

Mention may also be made, as agents of this type, of the products sold under the names Profix®, Max Flow® and Low Ash®.

A second method consists in bringing the solution into contact with at least one inorganic sulphide, at least one organic sulphur-containing compound or their mixture. That which has been indicated for the alternative form where the flue gases to be treated more particularly contain acids of formula HX remains valid and will therefore not be repeated here.

A third suitable method consists in bringing the solution into contact with an ion-exchange resin. Reference may be made, as above, to that which has been described for the additional purification of the solutions resulting from the treatment of flue gases mainly comprising acids of formula HX.

The purity of these crystals is such that they can be of economic value, directly or after drying or granulation.

The sodium sulphate can in particular be of economic value in glass manufacturing furnaces, for example.

The composition according to the invention can also be used as base constituent, as builder, in detergents and in animal food.

In the case of detergency, the porosity properties obtained according to the process of the invention can be improved, with respect to those of commercial bicarbonate, and can make it possible to increase the amount of organic products to be absorbed, such as, for example, non-ionic surface-active compounds.

The composition according to the invention also contains ammonia in the form of the ammonium ion. This product makes it possible to combine, with this composition, a nitrogen source for the formation of amino acids in animals.

Concrete but non-limiting examples of the invention will now be presented.

EXAMPLE 1

50 g of ammoniacal bicarbonate comprising 74.1% by weight of sodium bicarbonate, 9% by weight of sodium carbonate, 1% by weight of ammonium carbamate and 1 to 2% by weight of ammonium bicarbonate and carbonate, the remainder being water with a negligible amount of sodium chloride, are treated under air at 30° C.

The ammoniacal bicarbonate is heated in a glass reactor equipped with a jacket thermostatically controlled at 30° C. The reactor is open and flushed with an air atmosphere.

The results obtained are summarized in the table below.

| Duration (hours) | Loss in mass (weight %) | Total NH$_3$* (weight %) |
|---|---|---|
| 1 | 5.4 | 0.7 |
| 2 | 10.1 | 0.6 |

*Total NH$_3$(% by weight) expressed in the farm of the ammonium ion

The value relating to the total ammonia present, expressed in the form of content of ammonium ion, corresponds to all the ammonia compounds capable of releasing ammonia.

After two hours, it is found that the value of the total ammonia no longer shows any substantial variation, even after treatment for approximately ten hours.

The final product, that is to say after treating for two hours, comprises 83.7% by weight of sodium bicarbonate and 10% by weight of sodium carbonate, the remainder to 100% being composed of water with a negligible amount of sodium chloride.

EXAMPLE 2

The treatment of the same ammoniacal bicarbonate as in Example 1 is carried out in a glass reactor comprising a thermostatically-controlled jacket.

The atmosphere under which the heat treatment is carried out is as follows (Total pressure=1 bar absolute):

water partial pressure: 2 molar %,
carbon dioxide partial pressure: 98 molar %.

The temperature is continually increased and the nature of the compounds which are given off is analysed.

It is found that the ammonia-containing components decompose and water is given off from 25° C.

In contrast, the sodium bicarbonate does not decompose up to a temperature of 113° C.

This example thus demonstrates that, under an atmosphere controlled with respect to water and carbon dioxide, the ammonia-containing components can be removed without decomposing the sodium bicarbonate present.

EXAMPLE 3

The heat treatment of an ammoniacal bicarbonate with a composition identical to that in Example 1 is carried out in an oven, the atmosphere of which is controlled in order to have the following composition (Total pressure=1 bar absolute):

water partial pressure: 2 molar %,
carbon dioxide partial pressure: 98 molar %.

The temperature is increased by 0.5° C./min until a temperature of 80° C. is reached. The temperature is then maintained at this value for a duration of 6 and a half hours.

A mixture with the following composition is obtained:
88.2% by weight of sodium bicarbonate,
8.7% by weight of sodium carbonate,
0.4% by weight of ammonia-containing components (expressed as ammonium ion),
q.s. for 100% by weight of water, with a negligible amount of sodium chloride.

What is claimed is:

1. A composition comprising sodium bicarbonate, sodium carbonate, and ammonia in the form of ammonium salts, the ammonium salts comprise at least one of a bicarbonate, carbonate, and carbamate, the composition formed by heat treating ammoniacal bicarbonate at a temperature between 20 and 150° C., wherein the composition contains between 0.2 and 0.7% by weight of said ammonia, expressed as ammonium ion, and no more than 10% by weight of water.

2. The composition of claim 1, wherein the composition comprises at least 70% by weight of the sodium bicarbonate.

3. The composition of claim 2, wherein the composition comprises at least 80% by weight of the sodium bicarbonate.

4. The composition of claim 3, wherein the composition comprises between 80 and 95% by weight of the sodium bicarbonate.

5. The composition of claim 1, wherein the composition comprises less than 30% by weight of the sodium carbonate.

6. The composition of claim 5, wherein the composition comprises less than 20% by weight of the sodium carbonate.

7. The composition of claim 6, wherein the composition comprises between 5 and 15% by weight of the sodium carbonate.

8. The composition of claim 1, wherein the ammonium salt comprises less than 0.1% by weight of ammonium carbamate.

9. The composition of claim 8, wherein the ammonium salt comprises between 0.01 and 0.06% by weight of ammonium carbamate.

10. The composition of claim 1, further comprising water in an amount less than 10% by weight.

11. The composition of claim 10, wherein the composition comprises water in an amount between 1 and 6% by weight.

12. The composition of claim 1, wherein the composition is in the form of a powder.

13. The composition of claim 1, wherein the ammoniacal bicarbonate is heat treated in a controlled atmosphere comprising at least one of water and carbon dioxide.

14. The composition of claim 1, wherein the ammoniacal bicarbonate comprises 70 to 90% by weight of sodium bicarbonate, 2 to 20% by weight sodium carbonate, 0.2 to 1.0% by weight ammonia expresses as ammonium ion, 0.3 to 2.0% by weight of ammonium carbamate, and 5 to 20% by weight water.

15. The composition of claim 1, wherein the ammoniacal bicarbonate is heat treated as a temperature of between 20 and 130° C.

16. The composition of claim 1, wherein the ammoniacal bicarbonate is heat treated in an atmosphere containing between 0 and 10 molar % water vapor.

17. The composition of claim 1, wherein the ammoniacal bicarbonate is heat treated in an atmosphere containing between 0 and 100 molar % carbon dioxide.

18. The composition of claim 1, wherein the ammoniacal bicarbonate is heat treated in an atmosphere containing an inert gas.

19. The composition of claim 1, wherein the composition comprises at least 70% by weight of sodium bicarbonate, less than 30% by weight of sodium carbonate, and less than 1% by weight of ammonia expressed as ammonium ion.

20. The composition of claim 19, wherein the composition further comprises water in an amount less than 10% by weight.

21. The composition of claim 1, wherein the composition comprises 80 to 95% by weight of sodium bicarbonate, from 5 to 15% by weight of sodium carbonate, from 0.2 to 0.7% by weight of ammonia expressed as ammonium ion, from 0.01 to 0.06% by weight of ammonium carbamate and from 1 to 6% by weight of water.

22. A reactant having a composition comprising 80 to 95% by weight of sodium bicarbonate, 5 to 15% by weight of sodium carbonate, 0.2 to 0.7% by weight of ammonia expressed as ammonium ion, 0.01 to 0.06% by weight of ammonium carbamate, and 1 to 6% by weight of water.

23. A method of using the composition of claim 1, comprising reacting the composition with a flue gas, the flue gas comprising pollutants in the form of one or more of the following: acids represented by the formula HX; where X represents halogen; toxic metals; compounds of the $SO_x$ type; or mixtures thereof, whereby the reaction of the composition with the flue gas neutralizes the flue gas thereby reducing the amount of pollutants contained therein.

24. The method of claim 23, wherein the composition is placed into one of a suspension or a solution, then reacted with the flue gases.

25. The method of claim 23, wherein the composition is in the form of a powder when reacted with the flue gases.

26. The method of claim 25, wherein the powder has a particle size less than 50 μm.

27. The method of claim 23, wherein the composition is added to the flue gases in amounts such that the stoichiometric ratio of the composition to the HX acids is between 1.02 and 2.0.

28. The method of claim 23, wherein the composition is added to the flue gases in amounts such that the stoichiometric wherein the composition to the $SO_x$ compounds is between 1.02 and 2.0.

29. The method of claim 23, further comprising the steps of recovering solids produced by the reaction of the composition with the flue gases, subjecting the solids to dissolution in water, and separating the toxic metals therefrom.

30. A method of using the composition of claim 1, comprising reacting the composition with a flue gas, the flue gas comprising pollutants in the form of $NO_x$ compounds whereby the reaction of the composition with the flue gas neutralizes the flue gas thereby reducing the amount of pollutants contained therein.

31. The method of claim 30, wherein the composition is placed into one of a suspension or a solution, then reacted with the flue gases.

32. The method of claim 30, wherein the composition is in the form of a powder when reacted with the flue gases.

33. The method of claim 32, wherein the powder has a particle size less than 50 μm.

34. A method of using the composition of claim 1, comprising incorporating the composition into a detergent composition as a builder.

35. A method of using the composition of claim 1, comprising incorporation the composition into animal food as a base constituent.

* * * * *